United States Patent [19]
Rosen

[11] Patent Number: 6,014,435
[45] Date of Patent: Jan. 11, 2000

[54] UNAUTHORIZED CALL DEFEAT APPARATUS

[76] Inventor: Howard B. Rosen, 1 Lyncroft Rd., Montreal, Quebec, Canada, H3X 3E3

[21] Appl. No.: 08/883,844

[22] Filed: Jun. 27, 1997

[51] Int. Cl.[7] ................................................. H04M 1/66
[52] U.S. Cl. .......................... 379/200; 379/216; 379/283; 379/442
[58] Field of Search .................................. 379/188, 189, 379/199, 200, 355, 356, 445

[56] References Cited

U.S. PATENT DOCUMENTS

| | | | |
|---|---|---|---|
| 4,866,762 | 9/1989 | Pintar | 379/200 |
| 5,590,182 | 12/1996 | Stevens et al. | |

FOREIGN PATENT DOCUMENTS

| | | |
|---|---|---|
| 0 239 455 | 9/1987 | European Pat. Off. |
| 2 646 980 | 11/1990 | France |

*Primary Examiner*—Scott Wolinsky
*Assistant Examiner*—Bing Bui
*Attorney, Agent, or Firm*—Michael A. Lechter; William R. Bachand; Squire, Sanders & Dempsey

[57] ABSTRACT

A call defeat device to prevent calling unauthorized numbers, such as long distance, 1-900 etc., which is adapted to prevent a caller from successfully dialing one or more predetermined digit strings on a touch tone telephone connected to a given telephone line by apparatus including a touch tone decoder coupled to the telephone line and a microprocessor/memory for storing and issuing predetermined unauthorized digit strings, if dialed on the telephone, designates that the call is to be defeated. A comparator compares each digit string dialed on the telephone to the predetermined digit strings, and, if a match is sensed, a dialer sends onto the telephone line at least one DTMF digit, such as a "#", which will defeat the call in progress. In a variant of the unauthorized call defeat apparatus, if an unauthorized digit string is dialed, a mode of operation can be selected in which an audio tone, falling outside the standard passbands of all tones representing dialed digits, is applied to the telephone line so as to "jam" and thus prevent any meaningful communication on the line. The invention can be implemented as a stand alone device or incorporated into a telephone.

8 Claims, 3 Drawing Sheets

UNAUTHORIZED CALL DEFEAT APPARATUS

FIELD OF THE INVENTION

The invention relates to telephone systems and, more particularly, to an unauthorized call defeat telephone feature which prevents calling predetermined numbers, such as long distance calls, 1-900 calls, etc., from a telephone.

BACKGROUND OF THE INVENTION

It is often desirable to automatically prevent calls to certain telephone numbers and number classes from a given telephone or telephone line. For example, for some business telephones, it may be appropriate to prohibit making long distance calls in order to prevent employees from making personal long distance calls which are not only expensive, but take the employees' time.

Similarly, on a private line, it may be appropriate to automatically defeat 1-900 calls to prevent children from making calls which may be the sort which a parent wishes to prevent because the content may be inappropriate for a child and, further, because 1-900 calls carry a surcharge which can be exorbitant. It may also be desirable, on a given private line (or even a business line), to automatically defeat even a local, non-commercial call if, for example, the number would permit a child to contact a party which a parent does not wish the child to communicate with, either permanently or temporarily.

OBJECTS OF THE INVENTION

It is therefore a broad object of the invention to provide an unauthorized call defeat circuit which achieves these ends.

It is also an object of the invention to such an unauthorized call defeat circuit which stores predetermined disallowed character strings for comparison to dialed character strings.

In another aspect, it is an object of the invention to provide such a call defeat circuit which may be implemented as a stand alone unit or incorporated within a telephone.

SUMMARY OF THE INVENTION

Briefly, these and other objects of the invention are achieved by an unauthorized call defeat apparatus adapted to prevent a caller from successfully dialing one or more predetermined digit strings on a touch tone telephone connected to a given telephone line. The call defeat apparatus includes a touch tone decoder coupled to the telephone line and a microprocessor/memory for monitoring dialed character strings and also for storing predetermined unauthorized digit strings which, if dialed, designates that the call in progress is to be defeated. A comparator compares each digit string dialed on the telephone to the predetermined digit strings, and, if a match is sensed, a dialer sends onto the telephone line at least one DTMF digit which will defeat the call in progress. In a variant embodiment of the unauthorized call defeat apparatus, provision is made for telephone systems which are not based on DTMF technology. The apparatus is selectively configurable such that if an unauthorized digit string is dialed, an audio tone (rather than a DTMF digit) is applied to the telephone line so as to "jam" and thus prevent any meaningful communication on the line. (This version will also function on a DTMF system.) Either version of the invention can be implemented as a stand alone device or incorporated into a telephone.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
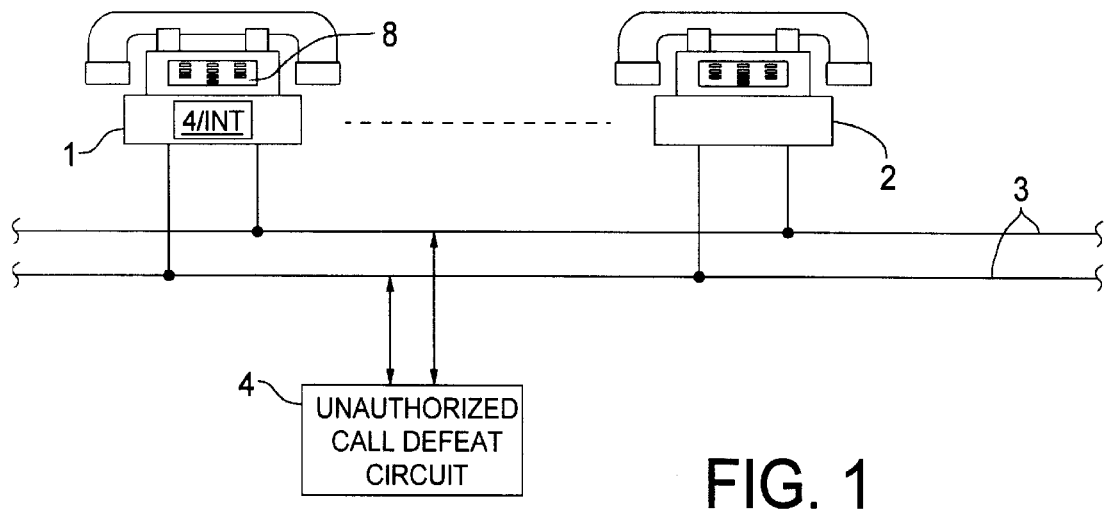
FIG. 1 illustrates a typical telephone installation in which the subject invention may be employed.

Referring first to FIG. 1, there is shown a high level block diagram of a telephone installation including the subject invention and by which the operation of the invention may be readily understood. One or more telephones, represented by telephone 1 and telephone 2, may be disposed across a local telephone line pair 3 which conventionally communicates with a telephone company central facility. Each of the telephones on the line pair 3 include a touch-tone key pad 8. In addition, an unauthorized call defeat circuit 4 according to the invention is coupled to the telephone line pair 3.

Consider now the basic operation of the invention. If any of the telephones 1, 2 are used to attempt to make an unauthorized call, the unauthorized call defeat circuit 4 recognizes this condition by examining the character or string of characters which identify the unauthorized call and responds by automatically placing call defeat signals onto the line pair 3. The call defeat signals, as will become more apparent below, can take the form of either 1) standard DTMF characters, such as the pound (#) or star (*) key, or 2) a disruptive audio tone which falls outside the pass bands of any of the standard frequencies representing the keys on the touch-tone pad.

In the former instance, the telephone system will interpret the string of characters it receives as a mis-dialed call and will not complete the call (or will send the call to a wrong number). In the latter instance, the entire calling process is "jammed", such that a caller undertaking to place the unauthorized call hearing the loud audio tone which a telephone system is unable to interpret and which prevents any sort of communication on the line 3.

Figure 2:
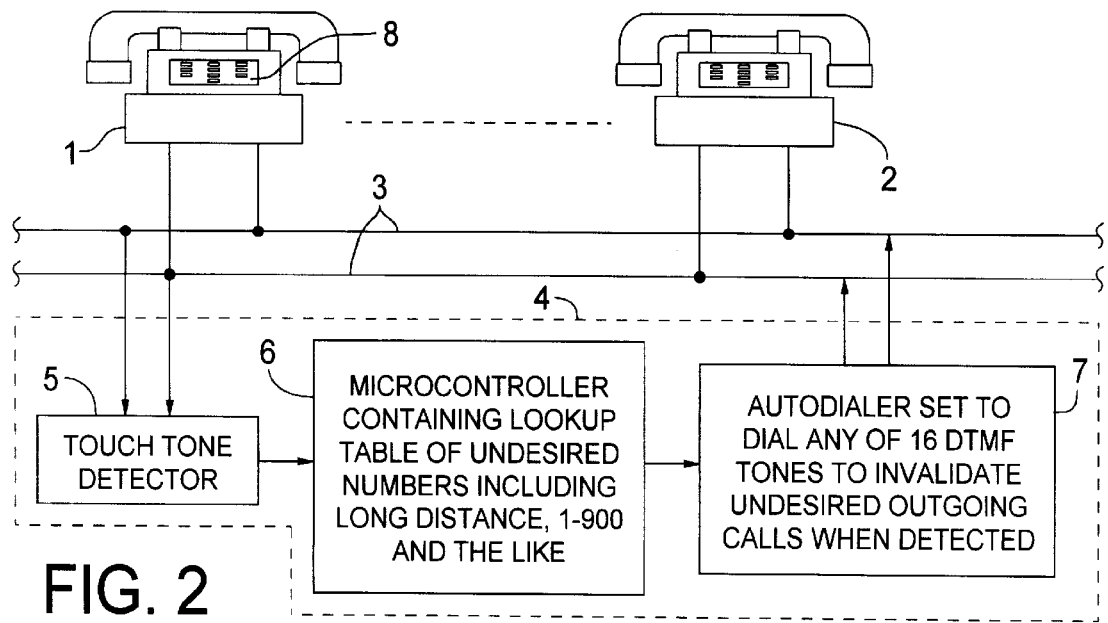
FIG. 2 is a partially schematic/partially high level block diagram of the telephone installation shown in FIG. 1.

Attention is now directed to FIG. 2 which is a mid-level block diagram of the unauthorized call defeat apparatus 4 of the present invention. The principal component blocks include: a touch tone decoder 5 connected to the telephone line pair 3, a microcontroller 6 coupled to receive signals from the touch tone decoder 5 and containing a look-up table of undesired numbers, including long distance, 1-900 and the like, which are to be defeated if attempted to be called on the line pair 3, and an autodialer 7 which is set to dial one or more DTMF tones to invalidate undesired outgoing calls when detected. Accordingly, it will be understood that the autodialer 7 places signals on the line pair 3 which will cause the system to thwart an attempt to dial an unauthorized number.

More particularly, those skilled in the art will understand that there are sixteen standard DTMF tone corresponding not only to the twelve keys on a standard touch tone dial pad, but also to four additional characters known as A, B, C and D. In accordance with the invention in one preferred embodiment, when an unauthorized number is sensed, at least one DTMF character is automatically inserted into the string being dialed. The DTMF character(s) inserted are typically A, B, C, D, * or # or combinations thereof because the telephone company central facility will be unable to interpret the string it receives as a valid telephone number and will abort the calling process. However, it will be appreciated that automatically inserting any numerical digit into the actually dialed string will also thwart the calling process because a wrong number will be reached or an incorrect call message will be issued back to the caller by the telephone company central.

Figure 3:
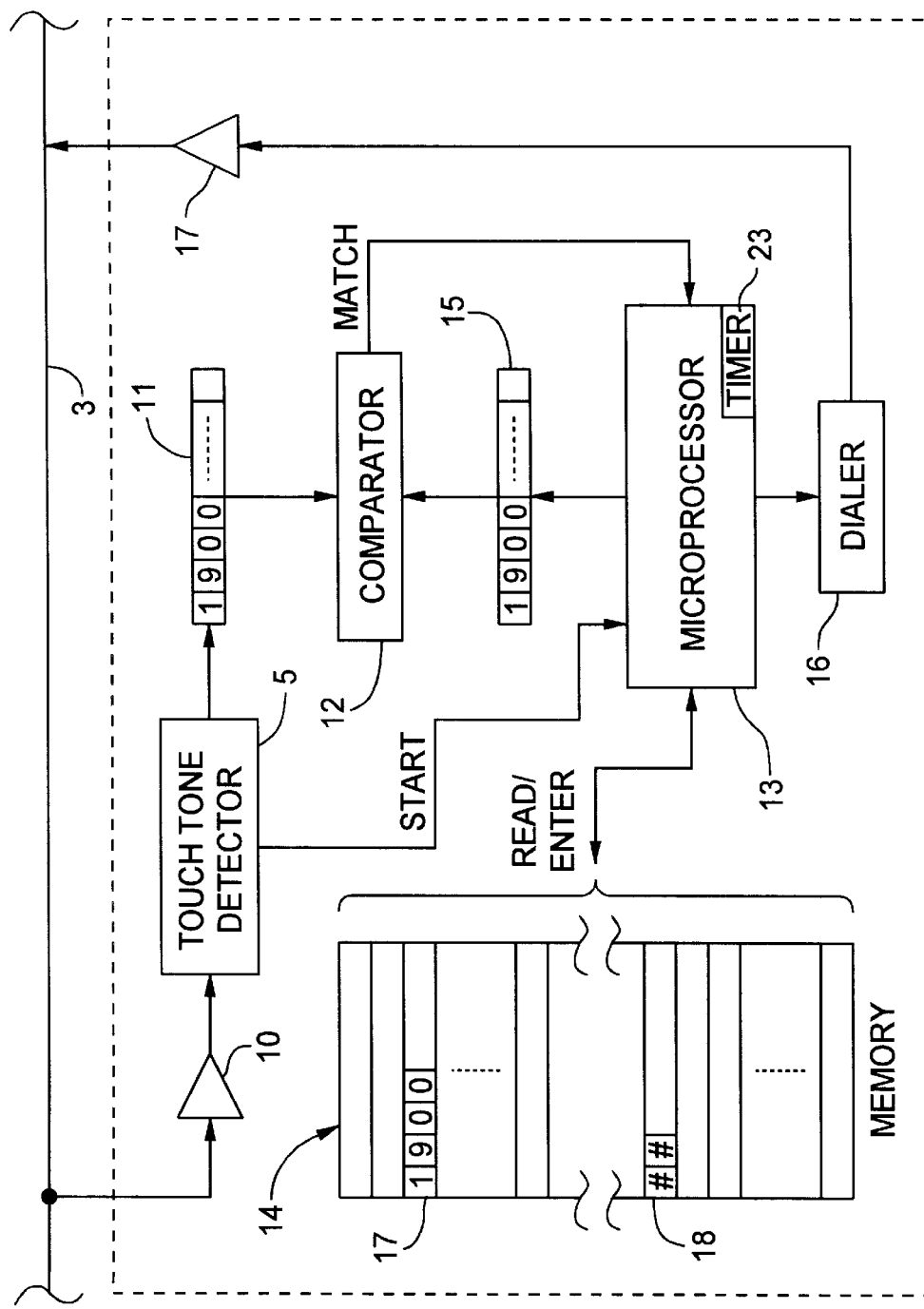
FIG. 3 a detailed block diagram of a specific embodiment of the invention.

Referring now to FIG. 3, a presently preferred embodiment of the unauthorized call defeat circuit 4A is shown in detail. (For convenience and clarity, the apparatus is shown single ended, it being understood that a suitable reference potential, such as local ground, is maintained throughout the local installation. Positive logic is also assumed throughout.)

An isolation amplifier 10 connected to the line 3 drives touch tone detector or decoder 5 which conventionally responds to predetermined audio tones to generate dialed digits. Thus, the digits dialed by a user of a telephone on the line 3 are entered into a register 11 for temporary storage. (As those skilled in the digital arts will understand, the actual entries into the register 11 are typically either in pure binary or binary coded decimal form.) The content of the register 11 at any given time is applied as a first input to a comparator 12. The second input to the comparator 12 is from a second register 15 which is loaded from an output of a microprocessor 13. Microprocessor 13 is activated whenever the first digit of any call is sensed by touch tone detector 5.

A repertoire of unauthorized numbers is preloaded into a memory 14 which communicates with the microprocessor 13. For example, the number string "1900" may be pre-entered into memory location 17 of the memory 14. In operation, microprocessor 13, in conjunction with the memory 14, can very rapidly sweep through its repertoire of preloaded unauthorized numbers and sequentially enter these numbers into the register 15. This process is sufficiently fast that each cumulative combination entered by a person dialing a number which is entered, digit-by-digit, into the register 11 can be repeatedly checked against the entire repertoire.

Assume, by way of example only, that one of the prohibited number strings is the sequence "1900" and that this string has just been dialed by a user and has accordingly been loaded into the register 11. As the microprocessor repeatedly and rapidly runs through its repertoire of unauthorized number strings, the unauthorized number string "1900" will be loaded into the register 15. Because the comparator 12 is constantly comparing its two inputs for identity between the contents of the registers 11 and 15, the condition will be sensed that the registers instantaneously hold the same numbers, indicating a compare condition between a dialed string and a predetermined unauthorized string. The comparator 12 thereupon sends a "match" signal to the microprocessor 13, indicating that an unauthorized number string has been dialed. The microprocessor 13 responds by activating the dialer 16 and sending to the dialer 16 a string of, for example, two pound (#) signs such as is stored in memory location 18. The dialed numbers generated in the dialer 16 are delivered to the line 3 via amplifier 17 and integrated into the string being manually dialed. (Alternatively, the dialer 16 may be internally programmed to dial any string of digits, in response to the sensed matched condition, which will cause the telephone system to invalidate the call. In that configuration, the call defeating string (s) need not be stored in the memory 14 which can therefore be smaller.)

Thus, it will be seen that a user attempting to dial a so-called 1-900 number will have the call automatically terminated/invalidated at the telephone company central by the action of the unauthorized call defeat circuit 4A shown in FIG. 3. Once the call defeating string has been placed onto the line 3, the call defeat circuit 4A can be deactivated by, for example, a timer 23 in the microprocessor 13 which times out the function after a suitable period. The call defeat circuit 4A is then placed into standby awaiting the next call placed on line 3 to reactivate it.

Figure 4:
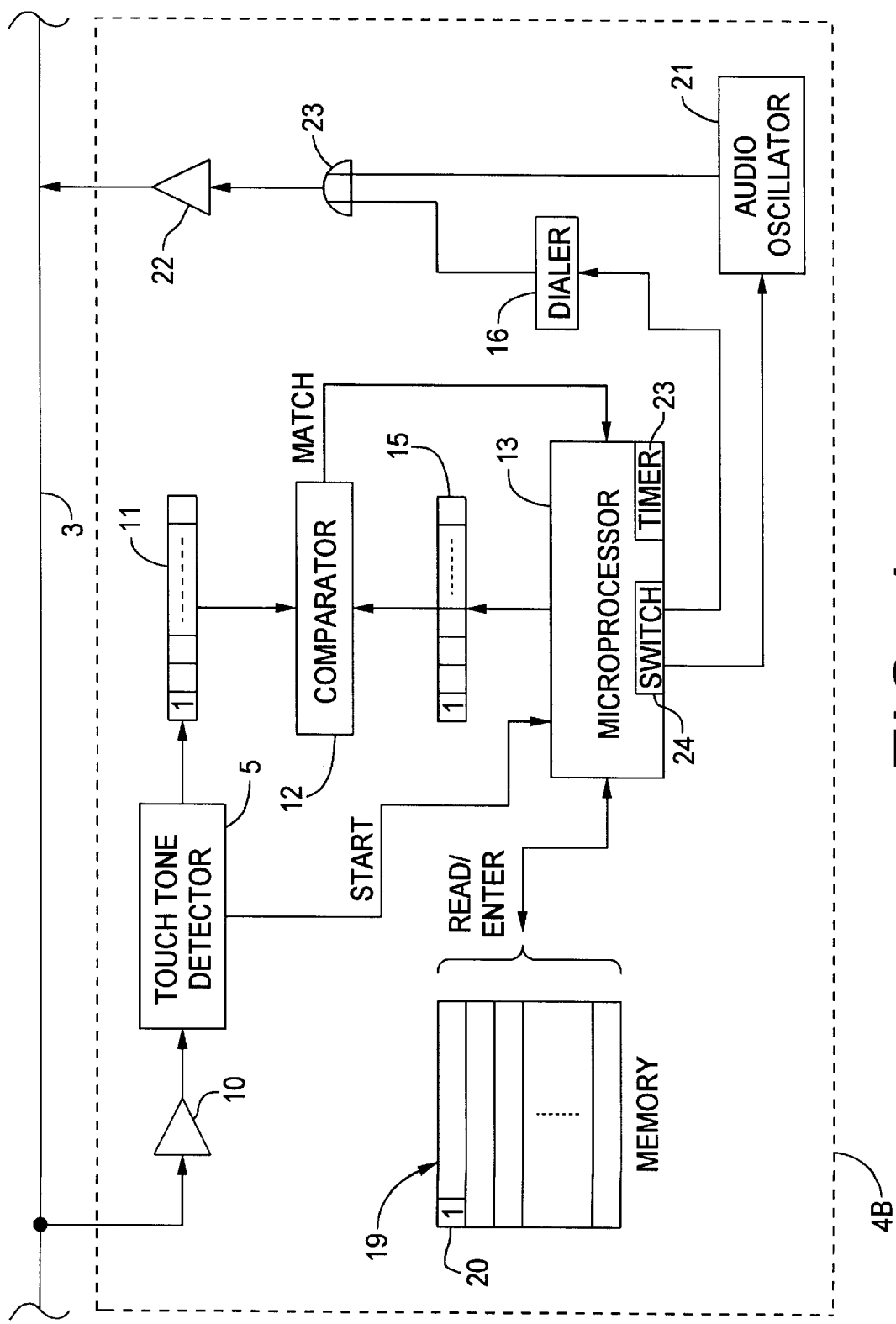
FIG. 4 is a detailed block diagram of a variant configuration of the invention.

FIG. 4 illustrates a variant embodiment 4B of the call defeat circuit which includes an alternative mode which operates on a slightly different principle. For this example, it is assumed that another of the predetermined unauthorized call categories is any long distance call such that the single first digit "1" is stored in location 20 of a memory 19. Thus, if a user of a telephone on line 3 initiates dialing a call string by dialing a "1", the "1" is loaded into the register 11 as previously described, and the microprocessor 13 sequentially loads all the predetermined unauthorized dial strings into the register 15 such that there will be an instantaneous match sensed by the comparator 12 in response to the user's act of dialing a "1" as the first number in a dialed string. Thus, the comparator 12 issues a "match" signal to the microprocessor 13 which, in the alternative embodiment shown in FIG. 4, either functions as previously describes or actuates an audio oscillator 21 which responds by sending onto the line 3 a constant audio tone which is outside the band pass of any of the DTMF audio tones corresponding to conventional dialed numbers. For example, an audio tone of nominally 1000 Hz may be issued by the audio oscillator 21 for application to the line 3 via amplifier 22. Preferably, the intensity of the tone placed on the line 3 in response to dialing an unauthorized string, such as the initial number "1", is sufficiently loud as to totally disrupt any attempt at communication on the line 3.

The mode of operation of the call defeat apparatus 4B may be selected by any suitable means such as by switch 24, a jumper on the circuit board, programming, etc. Thus, either the dialer 16 or the audio oscillator 21 will be activated when the dialing of an unauthorized number is sensed, and the output of the selected unit will be sent to the input of amplifier 22 via OR-gate 23 or a functional equivalent.

Referring to both FIGS. 3 and 4, the memories 14, 19 may be read-only memories (ROMs) with the predetermined unauthorized numbers entered at the time of manufacture or later by burning in. Alternatively, the memories may be either ROMs or random access read-write memories (RAMs) which can be accessed for programming by dialing a character string recognized by the microprocessor as calling for memory programming and then entering the unauthorized character strings desired for a given installation from one of the telephones on the line.

With the variant of the invention shown in FIG. 4, the memory 19 need not be as large as the memory 14 shown in FIG. 3 if, in the FIG. 3 embodiment, the dialed sequence string to be inserted into the actually dialed sequence string to be placed on the line 3 by the dialer 13 is stored in the memory 14. As a practical matter, with either of the variants of the invention discussed in conjunction with FIGS. 3 and 4, respectively, much or all of the circuitry included in the unauthorized call defeat circuits 4A, 4B may be implemented on one or two integrated circuit chips.

While the invention has been described as a separate device, it will be readily apparent to those skilled in the art that the invention is equally adaptable to integration into a telephone set. Referring briefly again to FIG. 1, such an integral installation is represented by the box 4/INT disposed within telephone 1. This arrangement has the advantage, for appropriate installations, that the defeat feature may be isolated to one or more selected telephones on a given telephone line pair 3 while other telephones on the same line pair are permitted access to the prohibited numbers.

Thus, while the principles of the invention have now been made clear in illustrative embodiments, there will be immediately obvious to the those skilled in the art many modifications of structure and components used in the practice of the invention which are particularly adapted for specific environments and operating requirements without departing from those principles.

What is claimed is:

1. An unauthorized call defeat apparatus adapted to prevent a caller from successfully dialing one or more predetermined digit strings on a touch tone telephone connected to a given telephone line, the call defeat apparatus comprising:

A) a touch tone decoder coupled to the telephone line, said touch tone decoder being responsive to the actuation of each key on the telephone by generating a representation of a corresponding digit;

B) a processor and a memory cooperatively adapted to generate at least one predetermined digit string representing an unauthorized digit string which, if present in a digit string dialed on the telephone, designates that the call is to be defeated;

C) a comparator for comparing each digit string dialed on the telephone to the predetermined digit string; and D) a dialer coupled to the telephone line and responsive to a determination by said comparator that a digit string dialed on the telephone is a match for the predetermined digit string by issuing at least one DTMF digit onto the telephone line to defeat the call in progress.

2. The unauthorized call defeat apparatus of claim 1 in which said processor and memory generate a plurality of predetermined digit strings representing a corresponding plurality of unauthorized digit strings and in which each of the plurality of predetermined digit strings is compared to cumulative digit strings dialed during a given call.

3. The unauthorized call defeat apparatus of claim 2 which is integral with the telephone.

4. The unauthorized call defeat apparatus of claim 2 in which successively dialed digits are accumulated in a first temporary storage and in which the predetermined digit strings are successively loaded into a second temporary storage such that said comparator issues a match signal to actuate said dialer when the contents of said first and second temporary storage are identical.

5. The unauthorized call defeat apparatus of claim 4 which is integral with the telephone.

6. The unauthorized call defeat apparatus of claim 1 which further includes:

A) an audio oscillator; and

B) mode selection means adapted to selectively couple the audio oscillator to the telephone line such that an audio tone, having a frequency outside the passbands for all DTMF tones representing digits dialed on the telephone, is issued onto the telephone line responsive to a determination that a digit string dialed on the telephone is a match with a predetermined digit string.

7. The unauthorized call defeat apparatus of claim 6 which is integral with the telephone.

8. The unauthorized call defeat apparatus of claim 1 which is integral with the telephone.

* * * * *